United States Patent [19]

Miller

[11] 4,394,362

[45] Jul. 19, 1983

[54] CRYSTALLINE SILICATE PARTICLE HAVING AN ALUMINUM-CONTAINING OUTER SHELL

[75] Inventor: Stephen J. Miller, San Francisco, Calif.

[73] Assignee: Chevron Research Company, San Francisco, Calif.

[21] Appl. No.: 258,497

[22] Filed: Apr. 28, 1981

[51] Int. Cl.³ .................. C01B 33/28; B01J 29/06
[52] U.S. Cl. .................. 423/328; 252/455 Z; 423/329
[58] Field of Search .................. 423/328–330; 252/455 Z; 260/448 C

[56] References Cited

U.S. PATENT DOCUMENTS

| | | | |
|---|---|---|---|
| 3,709,979 | 1/1973 | Chu | 423/329 |
| 3,941,871 | 3/1976 | Dwyer et al. | 423/328 X |
| 4,061,724 | 12/1977 | Grose et al. | 423/335 |
| 4,088,605 | 5/1978 | Rollmann | 423/328 X |
| 4,104,294 | 8/1978 | Grose et al. | 260/448 C |
| 4,175,114 | 11/1979 | Plank et al. | 423/329 |
| 4,203,869 | 5/1980 | Rollmann | 423/328 X |
| 4,309,275 | 1/1982 | Mulaskey | 208/109 |
| 4,309,276 | 1/1982 | Miller | 208/109 |

OTHER PUBLICATIONS

Ballmoos et al., "Nature" vol. 289, Feb. 26, 1981.
Bibby et al., "Nature" vol. 280, Aug. 23, 1979, pp. 264–265.

*Primary Examiner*—Edward J. Meros
*Attorney, Agent, or Firm*—D. A. Newell; S. R. La Paglia; W. L. Stumpf

[57] ABSTRACT

Crystalline silicate particles having an aluminum-containing isostructural outer shell. The particles are prepared by first crystallizing crystalline silicate particles from a first reaction medium and thereafter crystallizing an isostructural outer shell onto said crystalline silicate particles from a reaction medium containing an increased source of aluminum.

20 Claims, No Drawings

CRYSTALLINE SILICATE PARTICLE HAVING AN ALUMINUM-CONTAINING OUTER SHELL

TECHNICAL FIELD

This invention relates to crystalline silicate zeolites and to their synthesis. It more particularly relates to the synthesis of a crystalline silicate having an outer shell which contains aluminum, yet which has the same X-ray diffraction pattern and crystal structure as the core crystalline silicate.

Certain of the materials disclosed herein, and their syntheses, are well known. U.S. Pat. No. Re. 29,948, Dwyer et al, Mar. 27, 1978, discloses organosilicates having the ZSM-5 structure; U.S. Pat. No. 4,061,724, Grose et al, Dec. 6, 1977, discloses silicalite; Bibby et al, Nature Vol. 28, pp. 664–665 (Aug. 23, 1979), discloses "silicalite-2". The aluminosilicate zeolites ZSM-5 and ZSM-11 are described in U.S. Pat. Nos. 3,702,886 and 3,709,979.

Because of their ordered, porous structure, creating interconnected cavities, the crystalline silicates, and the ZSM zeolites, are selective toward certain molecules. That is to say, the pores accept for adsorption molecules of certain dimensions while rejecting those of larger dimensions. No known art discloses or suggests increasing selectivity by essentially activating the surface of the crystalline silicate catalyst with an outer isocrystalline layer of aluminum-containing zeolite. Several issued patents do disclose inactivating the surface of aluminosilicates by depositing an isocrystalline outer shell of aluminum-free material—U.S. Pat. No. 4,088,605, Rollman, May 9, 1978; U.S. Pat. No. 4,148,713, Rollman, Apr. 10, 1979; and U.S. Pat. No. 4,203,869, Rollman, May 20, 1980.

DESCRIPTION OF SPECIFIC EMBODIMENTS

I have discovered particles, comprising an inner portion and an outer portion disposed as a shell around said inner portion wherein said outer portion has the same crystal structure as said inner portion, said inner portion comprising an intermediate pore size crystalline silicate which is substantially free of aluminum and said outer portion comprising alumina.

The crystalline silicates useful herein are essentially aluminum-free materials of intermediate pore size, and can be the silicaceous analogues of intermediate pore size zeolites such as ZSM-5 and ZSM-11. In spite of their low aluminum content, the crystalline silicates are useful in cracking and hydrocracking and are outstandingly useful in high pressure catalytic dewaxing to produce olefins, and in olefin polymerization reactions, as well as other petroleum refining processes.

Although they have unusually low aluminum contents, i.e., high silica to alumina ratios, they are very active even when the silica to alumina ratio exceeds 1000:1. The activity is surprising since catalytic activity is generally attributed to framework aluminum atoms and cations associated with these aluminum atoms. These materials retain their crystallinity for long periods even in the presence of steam at high temperature, conditions which induce irreversible collapse of the framework of many zeolites, e.g., of the X and A type. Furthermore, carbonaceous deposits, when formed, can be removed by burning at higher than usual temperatures to restore activity. In many environments these crystalline silicates exhibit a very low coke forming capability, a characteristic conducive to very long times on stream between burning regenerations.

By "intermediate pore size" as used herein is meant an effective pore aperture in the range of about 5.0 to 6.5 Angstroms when the crystalline silicate is in the H-form. Silicates having pore apertures in this range tend to have unique molecular sieving characteristics. Unlike small pore zeolites such as erionite, they will allow hydrocarbons having some branching into the zeolitic void spaces. Unlike large pore zeolites such as the faujasites, they can differentiate between n-alkanes and slightly branched alkanes on the one hand and larger branched alkanes having, for example, quaternary carbon atoms.

The effective pore size can be measured using standard adsorption techniques and hydrocarbonaceous compounds of known minimum kinetic diameters. See Breck, *Zeolite Molecular Sieves*, 1974 (especially Chapter 8) and Anderson et al, J. Catalysis 58, 114 (1979), both of which are incorporated by reference.

Intermediate pore size crystalline silicates in the H-form will typically admit molecules having kinetic diameters of 5 to 6 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular silicate, but do not penetrate as quickly and in some cases, are effectively excluded. Compounds having kinetic diameters in the range of 6 to 6.5 Angstroms include: cyclohexane (6.0), 2,3-dimethylbutane (6.1), 2,2-dimethylbutane (6.2), m-xylene (6.1), and 1,2,3,4-tetramethylbenzene (6.4). Generally, compounds having kinetic diameters of greater than about 6.5 Angstroms cannot penetrate the pore apertures and thus cannot be adsorbed in the interior of the crystalline silicate. Examples of such larger compounds include: o-xylene (6.8), hexamethylbenzene (7.1), 1,3,5,-trimethylbenzene (7.5), and tributylamine (8.1).

The preferred effective pore size range is from about 5.3 to about 6.2 Angstroms. Silicalite, for example, falls within this range. The preferred crystalline silicates exhibit the X-ray diffraction pattern of ZSM-5 or ZSM-11 or both.

In performing adsorption measurements to determine pore size, standard techniques are used. It is convenient to consider a particular molecule as excluded if it does not reach at least 95% of its equilibrium adsorption value on the zeolite in less than about 10 minutes (p/po=0.5; 25° C.).

The silica to alumina ratio referred to may be determined by conventional analysis. This ratio is meant to represent, as closely as possible, the ratio (on a molar basis) of silica to alumina in the rigid anionic framework of the silicate crystal and to exclude aluminum in the binder or in cationic or other form within the channels. Although crystalline silicates with a silica to alumina ratio of at least 200:1 are useful, it is preferred to use crystalline silicates having higher ratios of at least about 500:1 and more preferably, 1000:1. Such materials, after activation, acquire an intracrystalline sorption capacity for normal hexane which, at low relative pressures is greater than that for water.

As noted above, crystalline silicates used in the process of the present invention have been reported in the literature in several places. "Silicalite" (U.S. Pat. No. 4,061,724, incorporated by reference) has, as synthesized, a specific gravity at 25° C. of 1.99±0.05 g/cc as measured by water displacement. In the calcined form (600° C. in air for 1 hour), silicalite has a specific gravity of 1.70±0.05 g/cc. With respect to the mean refractive index of silicalite crystals, values obtained by measurement of the as synthesized form and the calcined form (600° C. in air for 1 hour) are, respectively, 1.48±0.01 and 1.39±0.01.

The X-ray powder pattern of silicalite (600° C. calcination in air for 1 hour) has as its six strongest lines (i.e., interplanar spacings) those set forth in Table A ("S"—strong, and "VS"—very strong):

TABLE A

| d-A | Relative Intensity |
|---|---|
| 11.1 ± 0.2 | VS |
| 10.0 ± 0.2 | VS |
| 3.85 ± 0.07 | VS |
| 3.82 ± 0.07 | S |
| 3.76 ± 0.05 | S |
| 3.72 ± 0.05 | S |

The following Table B lists the data representing the X-ray powder diffraction pattern of a typical silicalite composition containing 51.9 moles of $SiO_2$ per mole of $(TPA)_2O$, prepared according to the method of U.S. Pat. No. 4,061,724, and calcined in air at 600° C. for 1 hour.

TABLE B

| d-A | Relative Intensity | d-A | Relative Intensity |
|---|---|---|---|
| 11.1 | 100 | 4.35 | 5 |
| 10.02 | 64 | 4.25 | 7 |
| 9.73 | 16 | 4.08 | 3 |
| 8.99 | 1 | 4.00 | 3 |
| 8.04 | 0.5 | 3.85 | 59 |
| 7.42 | 1 | 3.82 | 32 |
| 7.06 | 0.5 | 3.74 | 24 |
| 6.68 | 5 | 3.71 | 27 |
| 6.35 | 9 | 3.64 | 12 |
| 5.98 | 14 | 3.59 | 0.5 |
| 5.70 | 7 | 3.48 | 3 |
| 5.57 | 8 | 3.44 | 5 |
| 5.36 | 2 | 3.34 | 11 |
| 5.11 | 2 | 3.30 | 7 |
| 5.01 | 4 | 3.25 | 3 |
| 4.98 | 5 | 3.17 | 0.5 |
| 4.86 | 0.5 | 3.13 | 0.5 |
| 4.60 | 3 | 3.05 | 5 |
| 4.44 | 0.5 | 2.98 | 10 |

Crystals of silicalite in both the as synthesized and calcined form are orthorhombic and have the following unit cell parameters: a=20.05 A, b=19.86 A, c=13.36 A, with an accuracy of ±0.1 A on each of the values.

The pore diameter of silicalite is approximately 6 Angstrom units and its pore volume is 0.18 g/cc as determined by absorption. Silicalite adsorbs neopentane (6.2 A kinetic diameter) slowly at ambient room temperature. The uniform pore structure imparts size-selective molecular sieve properties to the composition, and the pore size permits separation of p-xylene from o-xylene and ethylbenzene as well as separations of compounds having quaternary carbon atoms from those having carbon-to-carbon linkages of lower value.

The crystalline silicates of U.S. Pat. No. Re. 29,948 (incorporated by reference) are disclosed as having a composition in the anhydrous state:

$$0.9\pm0.2\ [xR_2O+(1-x)\ M_{2/n}O]: <0.005$$
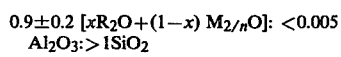
$$Al_2O_3: >1SiO_2$$

where M is a metal, other than a metal of Group IIIA, n is the valence of said metal, R is an alkyl ammonium radical and x is a number greater than 0 but not exceeding 1, said organosilicate being characterized by the x-ray diffraction pattern of Table C.

TABLE C

| Interplanar spacing d(A) | Relative Intensity |
|---|---|
| 11.1 | S |
| 10.0 | S |
| 7.4 | W |
| 7.1 | W |
| 6.3 | W |
| 6.4 } 5.97 | W |
| 5.56 | W |
| 5.01 | W |
| 4.60 | W |
| 4.25 | W |
| 3.85 | VS |
| 3.71 | S |
| 3.04 | W |
| 2.99 | W |
| 2.94 | W |

The crystalline silicate polymorph of U.S. Pat. No. 4,073,865 (incorporated by reference) is disclosed as having a specific gravity of 1.70±0.05 g/cc and a mean refractive index of 1.39±0.01 after calcination in air at 600° C., as prepared by a hydrothermal process in which fluoride anions are included in the reaction mixture. The crystals, which can be as large as 200 microns, exhibit a substantial absence of infrared adsorption in the hydroxyl-stretching region and are organophilic. They exhibit the X-ray diffraction pattern of Table D.

TABLE D

| d(A) | Intensity |
|---|---|
| 11.14 | 91 |
| 10.01 | 100 |
| 9.75 | 17 |
| 8.99 | 1 |
| 8.04 | 0.5 |
| 7.44 | 0.5 |
| 7.08 | 0.2 |
| 6.69 | 4 |
| 6.36 | 6 |
| 5.99 | 10 |
| 5.71 | 5 |
| 5.57 | 5 |
| 5.37 | 1 |
| 5.33 | 1 |
| 5.21 | 0.3 |
| 5.12 | 1.5 |
| 5.02 | 3 |
| 4.97 | 6 |
| 4.92 | 0.6 |
| 4.72 | 0.5 |
| 4.62 | 2 |
| 4.47 | 0.6 |
| 4.36 | 3 |
| 4.25 | 4 |
| 4.13 | 0.5 |
| 4.08 | 1.5 |
| 4.00 | 3 |
| 3.85 | 44 |
| 3.82 | 25 |
| 3.71 | 21 |
| 3.65 | 5 |
| 3.62 | 5 |
| 3.59 | 1 |
| 3.48 | 1.5 |
| 3.45 | 3 |
| 3.44 | 3 |
| 3.35 | 3 |
| 3.31 | 5 |
| 3.25 | 1.5 |

TABLE D-continued

| d(A) | Intensity |
|---|---|
| 3.23 | 0.8 |
| 3.22 | 0.5 |

The literature describes the following method for the preparation of the crystalline silicate, "silicalite-2" (Nature, August, 1979):

The silicalite-2 precursor is prepared using tetra-n-butylammonium hydroxide only, although adding ammonium hydroxide or hydrazine hydrate as a source of extra hydroxyl ions increases the reaction rate considerably. A successful preparation is to mix 8.5 moles $SiO_2$ as silicic acid (74% $SiO_2$), 1.0 mole tetra-n-butylammonium hydroxide, 3.0 moles $NH_4OH$ and 100 moles water in a steel bomb and heat at 170° C. for 3 days.

The preparation of crystalline silicates generally involves the hydrothermal crystallization of a reaction mixture comprising water, a source of silica and an organic templating compound at a pH of 10 to 14. Representative templating moieties include quaternary cations such as $XR_4$ wherein X is phosphorous or nitrogen and R is an alkyl radical containing from 2 to 6 carbon atoms; e.g., tetrapropyl ammonium hydroxide or halide.

When the organic templating compound is provided to the system in the hydroxide form in sufficient quantity to establish a basicity equivalent to a pH of 10 to 14, the reaction mixture need contain only water and a reactive form of silica as additional ingredients. In those cases in which the pH is required to be increased to about 10, ammonium hydroxide or alkali metal hydroxides can be suitably employed for that purpose, particularly the hydroxides of lithium, sodium or potassium. It has been found that not more than 6.5 moles of alkali metal oxide per mole-ion of alkylonium compound is required for this purpose even if none of the alkylonium compound is provided in the form of its hydroxide.

The specific crystalline silicates described, when prepared in the presence of organic cations, are catalytically inactive, possibly because the intracrystalline free space is occupied by organic cations from the forming solution. The silicates may, however, be activated by heating in an inert atmosphere at 1000° F. for 1 hour, followed by base exchange with ammonium salts and followed by a further calcination at 1000° F. in air.

The silicates can be used either in the alkali metal form, e.g., the sodium form, the ammonium form, the hydrogen form, or another univalent or multivalent cationic form. Preferably, one or the other of the last two forms is employed. They can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or physically intimately admixed therewith. Such component can be impregnated in or on to the present catalyst such as, for example, by in the case of platinum, treating the zeolite with a platinum metal-containing ion. Thus, suitable platinum compounds include chloroplatinic acid, platinous chloride and various compounds containing the platinum amine complex.

The compounds of the useful platinum or other metals can be divided into compounds in which the metal is present in the cation of the compound and compounds in which it is present in the anion of the compound. Both types which contain the metal in the ionic state can be used. A solution in which platinum metals are in the form of a cation of cationic complex, e.g., $Pt(NH_3)_6Cl_4$ is particularly useful. For some hydrocarbon conversion processes, this noble metal form of the catalyst is unnecessary such as in low temperature, liquid phase ortho-xylene isomerization.

The catalyst, when employed either as an adsorbent or as a catalyst in one of the aforementioned processes, should be dehydrated at least partially. This can be done by heating to a temperature in the range of 200° C. to 600° C. in an atmosphere such as air, nitrogen, etc., and at atmospheric or subatmospheric pressures for between 1 and 48 hours. Dehydration can also be performed at lower temperatures merely by placing the catalyst in a vacuum, but a longer time is required to obtain a sufficient amount of dehydration.

In a preferred aspect of this invention, the catalysts hereof are selected as those having a crystal framework density, in the dry hydrogen form, of not substantially below about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meir. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pycnometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, is important as the locus of catalytic activity.

Following completion of synthesizing the crystalline silicate, it is essential, for the purposes of this invention, to reduce or eliminate the nucleation of new silicate crystals while at the same time keeping the crystal growth high. To produce the outer, aluminum-containing shell, it is also essential that reactive aluminum be added to the reaction mixture.

It is therefore necessary to produce the silicate and to add an aluminum-containing mixture to obtain crystallization of $SiO_2$ and $Al_2O_3$ on the surface of the silicate, the $SiO_2/Al_2O_3$ mixture having the same crystal structure as the core silicate. This can be accomplished by a total replacement of the reaction mixture or by adding an aluminum-containing solution to the original reaction mixture.

Typical reaction conditions include heating the mixture at a temperature of from about 80° C. to about 200° C. for a period of time from about 4 hours to about 30 days. As in the case of general aluminosilicate synthesis, the digestion of the gel particles is carried out until the crystalline aluminosilicate layer forms completely as the outer shell of the crystalline particles. The product crystals are then separated, as by cooling and filtering, and are water washed and dried at from about 80° C. to about 150° C.

The most efficient method of preparation is to form the crystalline silicate, and then use the crystalline silicate particles as seeds in the reaction mixtures normally used to prepare intermediate pore size zeolites. Either the pH of the reaction mixture or the temperature can be used to control and minimize the nucleation of separate zeolite particles. Lower pH's, e.g., 9-10, reduce silica solubility thereby limiting the number of nucleation sites and causing aluminosilicate deposition on the seeds. Lower temperatures slow the rate of crystal growth and nucleation so as to cause aluminosilicate deposition on the seeds. At lower pH's, e.g., 9-10, a normal temperature range for hydrothermal crystallization can be used. I prefer to control the temperature to the range of about 100° C. to 120° C. and the pH to about 10-12. Under these conditions nucleation of the zeolite is minimized while the aluminosilicate layer continues to form on the exterior of the silicate seed. Seeding techniques such as those of U.S. Pat. No. 4,175,114, Plank et al., Nov. 20, 1979 (incorporated by reference), which use an alcohol and ammonium hydroxide mixture in place of tetrapropylammonium cations can also be used. Using these techniques, I prefer to control the pH to 11-14 and the temperature to about 120° C. to 160° C. Generally, the organic cation/$SiO_2$ mole ratio and the hydroxide content of the mixture from which the crystalline silicate is prepared are higher than in the mixture in which the isostructural alumina containing layer is crystallized onto the silicate.

Members of the present family of materials can have the original cations associated therewith replaced by a wide variety of other cations according to techniques well known in the art. Typical replacing cations would include hydrogen, ammonium and metal cations including mixtures of the same. Of the replacing metallic cations, particular preference is given to cations of metals such as rare earth metals, manganese and calcium, as well as metals of Group II of the Periodic Table, e.g., zinc and Group VIII of the Periodic Table, e.g., nickel.

Typical ion-exchange techniques include contacting the members of the family of zeolites with a salt of the desired replacing cation or cations. Although a wide variety of salts can be employed, particular preference is given to chlorides, nitrates and sulfates.

Representative ion-exchange techniques are disclosed in a wide variety of patents including U.S. Pat. Nos. 3,140,249; 3,140,251; and 3,140,253.

Following contact with the salt solution of the desired replacing cation, the materials are then preferably washed with water and dried at a temperature ranging from 150° F. to about 600° F. and thereafter calcined in air or other inert gas at temperatures ranging from about 500° F. to about 1200° F. for periods of time ranging from 1 to 48 hours or more.

Regardless of the cations replacing the sodium in the synthesized form of the catalyst, the spatial arrangement of the aluminum, silicon and oxygen atoms which form the basic crystal lattices in any given zeolite of this invention will remain essentially unchanged by the described replacement of sodium or other alkali metal as could be determined by taking an X-ray powder diffraction pattern of the ion-exchanged material. For example, the silicate/aluminosilicate structure of the ZSM-5 X-ray diffraction pattern will reveal a pattern substantially the same as that set forth in Table C above.

The materials of the instant invention are manufactured into compositions having a wide variety of shapes and sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate/aluminosilicate can be extruded before drying or dried or partially dried and then extruded.

In the case of many zeolites, it is desired to incorporate the crystalline silicates/aluminosilicates of my invention with other materials resistant to the temperatures and other conditions employed in organic conversion processes. Such materials include active and inactive materials and synthetic or naturally occurring zeolites as well as iorganic materials such as clays, alumina, silica, and/or metal oxides. The latter may be either naturally occurring or in the form of gelatinous precipitates of gels including mixtures of silica and metal oxides. Use of a material in conjunction with the present catalyst tends to improve the conversion and/or selectivity of the catalyst in certain organic conversion processes. Inactive materials suitably serve as diluents to control the amount of conversion in a given process so that products can be obtained economically and in an orderly manner without employing other means for controlling the rate of reaction. Normally, zeolite materials have been incorporated into naturally occurring clays, e.g., bentonite and kaolin, to improve the crush strength of the catalyst under commercial operating conditions. These materials, i.e., clays, oxides, etc., function as binders for the catalyst. It is desirable to provide a catalyst having good crush strength, because in a petroleum refinery the catalyst is often subjected to rough handling, which tends to break the catalyst down into powder-like materials which cause problems in processing. These clay binders have been employed for the purpose of improving the crush strength of the catalyst.

Naturally occurring clays which can be composited with the crystalline silicate/aluminosilicate include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the materials of my invention can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesium and silica-magnesia-zirconia. The matrix can be in the form of a cogel. The relative proportions of the finely divided crystalline aluminosilicate containing the aluminum-rich outer shell and inorganic oxide gel matrix vary widely with the crystalline aluminosilicate content ranging from about 1 to about 90 percent by weight and more usually, particularly when the composite is prepared in the form of beads in the range of about 2 to about 50 percent by weight of the composite.

For most catalytic applications, it is preferred that the crystalline silicate be free of basic metals which tend to neutralize its active sites. The usual basic metals found in the zeolites are alkali metals, especially sodium, which are used in the hydrothermal reaction mixture. For most applications known to the art to be catalyzed by acidic zeolites, the alkali metal content is preferably less than 0.1% by weight, more preferably less than 0.03%, and most preferably less than about 0.01% by weight. For a few unusual, nonacidic processes, such as the formation of benzene from $C_7$ alkanes, for which a zeolite substantially free of acidity is required, the alkali metal content is preferably high.

Employing the catalyst of this invention containing a hydrogenation component, heavy petroleum residual stocks, cycle stocks, and other hydrocrackable charge stocks can be hydrocracked at temperatures between 400° F. and 850° F. using molar ratios of hydrogen to hydrocarbon charge in the range between 2 and 80. The pressure employed will vary between 10 and 2,500 psig and the liquid hourly space velocity between 0.1 and 10.

Employing the catalyst of this invention for catalytic cracking, hydrocarbon cracking stocks can be cracked at contact times of from 0.1 to 10 seconds, a temperature between about 550° F. and 1300° F., a pressure between about atmospheric and a hundred atmospheres.

Employing a catalytically active form of a member of zeolites of this invention containing a hydrogenation component, reforming stocks can be reformed employing a temperature between 700° F. and 1000° F. The pressure can be between 100 and 1,000 psig, but is preferably between 200 and 700 psig. The liquid hourly space velocity is generally between 0.1 and 10, preferably between 0.5 and 4 and the hydrogen to hydrocarbon mole ratio is generally between 1 and 20, preferably between 4 and 12.

The catalyst can also be used for hydroisomerization of normal paraffins, when provided with a hydrogenation component, e.g., platinum. Hydroisomerization is carried out at a temperature between 200° F. and 700° F., preferably 300° F. to 550° F., with a liquid hourly space velocity between 0.1 and 2, preferably between 0.25 and 0.50 employing hydrogen such that the hydrogen to hydrocarbon mole ratio is between 1:1 and 5:1. Additionally, the catalyst can be used for olefin isomerization employing temperatures between 30° F. and 500° F.

The catalysts of my invention are particularly useful in olefin polymerization reactions where the core crystalline silicate polymerizes lower alkyl olefins such as propene and butene to longer, straight or slightly branched chain olefins, while the outer, more active aluminosilicate shell can catalyze the further polymerization of the lower alkyl olefins with the longer chains produced by the core. The result is even larger, multiply branched long chain olefins. Further, because of the controllable depth of the outer shell, both long and branched chain olefins can be polymerized without having to fit completely within the pore structure to reach the catalytic sites. Further, the aluminosilicates produced are relatively large, and easy to produce and filter. Because most of the acid sites are near the outer surface, the zeolites enhance reactions which are limited by diffusion, e.g., polymerization of large olefins.

EXAMPLE

A crystalline silicate according to my invention is prepared using the following procedure: Dissolve 2.3 g NaNO$_3$ in 10 ml H$_2$O. Put 100 g of 25% tetrapropylammonium hydroxide solution in a polyethylene beaker and add the NaNO$_3$ solution with rapid stirring. While stirring, add 40 g Ludox AS-30 (30% silica). Then add 60 g of crystalline silicate seeds prepared according to U.S. Pat. No. 4,061,724, followed by a solution of 2.1 g Al(NO$_3$)$_3$.9H$_2$O in 10 ml H$_2$O. Adjust the pH to 12.0 with concentrated HCl. Pour the reaction mixture into a teflon bottle and put in a stainless steel autoclave for 10 days at 100° C. Cool and remove the bottle. Filter and water-wash the product and dry it overnight in a vacuum oven at 120° C. under 10" N$_2$. Calcine 8 hours at 450° C. The product particles have a crystalline silicate core having a silica:alumina mole ratio of greater than 200:1 surrounded by an alumina containing outer shell having a silica:alumina mole ratio of less than 100:1. The crystal lattice structure of the particles is uniform.

I claim:

1. A particle, comprising an inner portion and an outer portion disposed as a shell around said inner portion wherein said outer portion has the same crystal structure as said inner portion, said inner portion comprising an intermediate pore size crystalline silicate having a silica:alumina mole ratio greater than about 200:1, and said outer portion having a silica:alumina mole ratio of less than about 100:1 and wherein said particle is prepared by a process comprising:
    (1) initiating crystallization in a crystallization medium substantially free of aluminum to produce the intermediate pore size crystalline silicate;
    (2) adding a source of aluminum to said crystallization medium; and
    (3) crystallizing onto said crystalline silicate the isostructural outer portion which comprises alumina.

2. A particle, comprising an inner portion and an outer portion disposed as a shell around said inner portion wherein said outer portion has the same crystal structure as said inner portion, said inner portion comprising an intermediate pore size crystalline silicate having a silica:alumina mole ratio greater than about 200:1, and said outer portion having a silica:alumina mole ratio of less than about 100:1 and wherein said particle is prepared by a process comprising:
    (1) crystallizing the intermediate pore size crystalline silicate from a first reaction medium substantially free of aluminum;
    (2) removing said crystalline silicate from said first reaction medium;
    (3) adding said crystalline silicate to a second reaction medium comprising sources of aluminum, and
    (4) crystallizing the isostructural, alumina containing outer layer onto said crystalline silicate.

3. The particle of claim 2 having the X-ray diffraction pattern of ZSM-5.

4. The particle of claim 2 having the X-ray diffraction pattern of ZSM-11.

5. A process for preparing a particle, comprising an inner portion and an outer portion disposed as a shell around said inner portion wherein said outer portion has the same crystal structure as said inner portion, said inner portion comprising an intermediate pore size crystalline silicate having a silica:alumina mole ratio greater than about 200:1, and said outer portion having a silica:alumina mole ratio of less than about 100:1, comprising:

(1) initiating crystallization in a crystallization medium substantially free of aluminum to produce the intermediate pore size crystalline silicate;

(2) adding a source of aluminum to said crystallization medium; and (3) crystallizing onto said crystalline silicate the isostructural outer portion which comprises alumina.

6. The process of claim 5 wherein the reaction mixture comprises sources of organic cation, silica and hydroxide ion.

7. The process of claim 6 wherein the source of hydroxide ion is sodium hydroxide.

8. The process of claim 6 wherein in step (2) the organic ion to $SiO_2$ mole ratio is reduced from that in step (1).

9. The process of claim 7 wherein in step (2) the hydroxide content is lower than that in step (1).

10. The process of claim 5 wherein step (3) is performed at a temperature of from about 100° C. to 120° C. and at a pH of from 10 to 12.

11. The process of claim 5 wherein said crystalline silicate is silicalite having a silica:alumina mole ratio greater than about 200:1 and said isostructural outer portion has a silica:alumina mole ratio less than about 100:1.

12. A process for preparing a particle, comprising an inner portion and an outer portion disposed as a shell around said inner portion wherein said outer portion has the same crystal structure as said inner portion, said inner portion comprising an intermediate pore size crystalline silicate having a silica:alumina mole ratio greater than about 200:1, and said outer portion having a silica:alumina mole ratio of less than about 100:1, comprising:

(1) crystallizing the intermediate pore size crystalline silicate from a first reaction medium substantially free of aluminum;

(2) removing said crystalline silicate from said first reaction medium;

(3) adding said crystalline silicate to a second reaction medium comprising sources of aluminum, and (4) crystallizing the isostructural, alumina containing outer layer onto said crystalline silicate.

13. The process of claim 12 wherein the first and second reaction mixtures comprise sources of organic cation, silica and hydroxide ion.

14. The process of claim 13 wherein the source of hydroxide ion is sodium hydroxide.

15. The process of claim 13 wherein in step (3) the organic ion to $SiO_2$ mole ratio is reduced from that in step (1).

16. The process of claim 14 wherein in step (3) the hydroxide content is lower than that in step (1).

17. The process of claim 12 wherein step (4) is performed at a temperature of from about 100° C. to 120° C. and at a pH of from 10 to 12.

18. The process of claim 12 wherein said crystalline silicate is silicalite having a silica:alumina ratio greater than about 200:1 and said isostructural outer portion has a silica:alumina mole ratio less than about 100:1.

19. The composition of claim 2 wherein the silica:alumina mole ratio of said inner portion is greater than about 500:1.

20. The composition of claim 2 wherein the silica:alumina mole ratio of said inner portion is greater than about 1000:1.

* * * * *